United States Patent
Tatsumi et al.

(10) Patent No.: US 9,421,771 B2
(45) Date of Patent: Aug. 23, 2016

(54) LIQUID EJECTION HEAD AND METHOD OF MANUFACTURING THE SAME

(71) Applicant: CANON KABUSHIKI KAISHA, Tokyo (JP)

(72) Inventors: Junji Tatsumi, Kawasaki (JP); Genji Inada, Koshigaya (JP); Sayaka Seki, Tokyo (JP); Yuichiro Akama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/706,857

(22) Filed: May 7, 2015

(65) Prior Publication Data

US 2015/0321475 A1     Nov. 12, 2015

(30) Foreign Application Priority Data

May 12, 2014   (JP) .................................. 2014-098368
Mar. 19, 2015  (JP) .................................. 2015-056092

(51) Int. Cl.
*B41J 2/14*   (2006.01)
*B41J 2/16*   (2006.01)
(Continued)

(52) U.S. Cl.
CPC ................ *B41J 2/16* (2013.01); *B29C 65/524* (2013.01); *B32B 3/06* (2013.01); *B32B 9/00* (2013.01); *B32B 9/005* (2013.01); *B32B 27/06* (2013.01); *B32B 37/1292* (2013.01); *B32B 37/18* (2013.01); *B32B 38/0004* (2013.01); *B41J 2/14* (2013.01); *B41J 2/1433* (2013.01); *B41J 2/162* (2013.01); *B41J 2/1603* (2013.01); *B41J 2/1623* (2013.01); *F16B 11/00* (2013.01); *B29C 65/1406* (2013.01); *B29C 65/4835* (2013.01); *B29C 65/4845* (2013.01); *B29C 66/1122* (2013.01); *B29C 66/54* (2013.01); *B29C 66/71* (2013.01);
(Continued)

(58) Field of Classification Search
CPC ........ B41J 2/1433; B41J 2/162; B41J 2/1623; B29C 65/524; B32B 3/06; B32B 9/00; B32B 9/005; B32B 27/06; B32B 37/1292; B32B 37/18; B32B 2037/1253; B32B 2250/02; B32B 2313/00; B32B 2315/02; Y10T 156/1064; B29K 2701/00; B29K 2707/00; B29K 2709/02; B29L 2031/767
USPC .............................................. 347/20, 40, 44
See application file for complete search history.

(56) References Cited

U.S. PATENT DOCUMENTS

| 5,736,998   | A  | * | 4/1998 | Caren  | ................ | B41J 2/14024 347/45 |
| 2002/0041310 | A1 | * | 4/2002 | Kaneko | ................ | B41J 2/14024 347/65 |

(Continued)

FOREIGN PATENT DOCUMENTS

| JP | 2002-019119 A | 1/2002 |
| JP | 2007-055071 A | 3/2007 |

*Primary Examiner* — Stephen Meier
*Assistant Examiner* — Alexander D Shenderov
(74) *Attorney, Agent, or Firm* — Canon USA, Inc., IP Division (57) ABSTRACT

A liquid ejection head includes a recording element substrate that ejects liquid, and an element-substrate support member to which the recording element substrate is bonded with an adhesive. A groove to be filled with the adhesive is provided in a bonding region of the element-substrate support member, at which the element-substrate support member and the recording element substrate are bonded together, along a part or an entirety of the outer circumference of the recording element substrate.

13 Claims, 7 Drawing Sheets

(51) Int. Cl.
*B32B 38/00* (2006.01)
*B32B 37/18* (2006.01)
*B32B 37/12* (2006.01)
*B32B 27/06* (2006.01)
*B29C 65/52* (2006.01)
*B32B 9/00* (2006.01)
*B32B 3/06* (2006.01)
*F16B 11/00* (2006.01)
*B29K 701/00* (2006.01)
*B29K 707/00* (2006.01)
*B29K 709/02* (2006.01)
*B29L 31/00* (2006.01)
*B29C 65/48* (2006.01)
*B29C 65/00* (2006.01)
*B29C 65/14* (2006.01)

(52) U.S. Cl.
CPC ....... *B29C 66/73112* (2013.01); *B29C 66/7461* (2013.01); *B29K 2701/00* (2013.01); *B29K 2707/00* (2013.01); *B29K 2709/02* (2013.01); *B29L 2031/767* (2013.01); *B32B 2037/1253* (2013.01); *B32B 2250/02* (2013.01); *B32B 2313/00* (2013.01); *B32B 2315/02* (2013.01); *Y10T 156/1064* (2015.01)

(56) References Cited

U.S. PATENT DOCUMENTS

2003/0081058 A1\* 5/2003 McElfresh ........... B41J 2/14024
  347/40
2003/0188827 A1\* 10/2003 Murthy ................ B41J 2/14024
  156/275.1
2009/0309938 A1\* 12/2009 Yoneda .................. B41J 2/1603
  347/85

\* cited by examiner

LIQUID EJECTION HEAD AND METHOD OF MANUFACTURING THE SAME

BACKGROUND OF THE INVENTION

1. Field of the Invention

The present invention relates to a liquid ejection head that ejects liquid and to a method of manufacturing the liquid ejection head.

2. Description of the Related Art

Figure 6A:
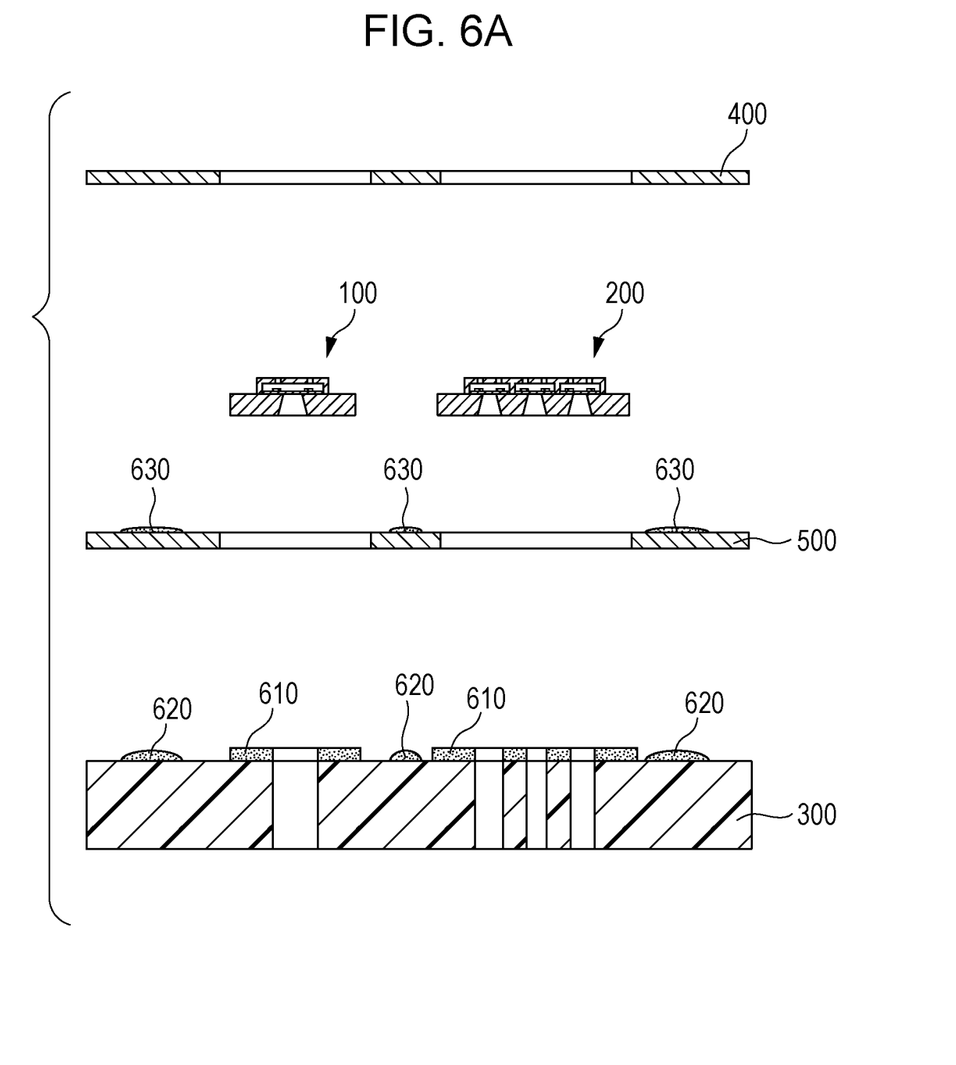
FIGS. 6A and 6B are an exploded sectional view and an exploded perspective view showing the conventional liquid ejection head, respectively.
Figure 6B:
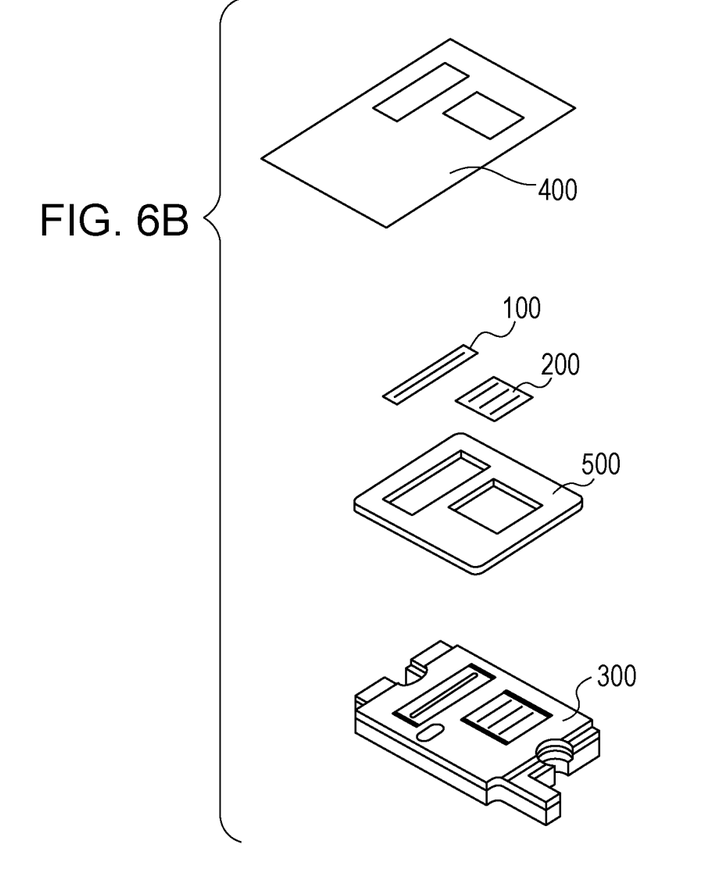

Liquid ejection recording apparatuses perform recording by ejecting liquid onto recording media, such as paper, and have the following characteristics: high-speed recording, ability to record on various recording media, little mechanical noise during recording, low running cost, etc. FIG. 6A is an exploded sectional view showing components of a conventional liquid ejection head. FIG. 6B is a perspective view of the components shown in FIG. 6A. The conventional liquid ejection head includes recording element substrates 100 and 200, an element-substrate support member 300, a wiring substrate 400, and a wiring-substrate support member 500. The recording element substrates 100 and 200 are bonded to a flat surface of the element-substrate support member 300 with an adhesive 610. The recording element substrates 100 and 200 are electrically connected to the wiring substrate 400. The wiring substrate 400 is bonded to the wiring-substrate support member 500 with an adhesive 630. The wiring-substrate support member 500 is bonded to the element-substrate support member 300 with an adhesive 620.

In Japanese Unexamined Patent Application Publication No. 2002-19119, a thermosetting adhesive is used as the above-described adhesives. When the thermosetting adhesive is cured by heating in an oven, the recording element substrates 100 and 200 and the wiring-substrate support member 500 are bonded to the element-substrate support member 300, and the wiring substrate 400 is bonded to the wiring-substrate support member 500.

Furthermore, Japanese Unexamined Patent Application Publication No. 2007-55071 discloses that a light-curable adhesive is used to bond the recording element substrate and the element-substrate support member. In the technique disclosed in Japanese Unexamined Patent Application Publication No. 2007-55071, the light-curable adhesive is applied to four corners of a bonding surface of the recording element substrate and is irradiated with light (ultraviolet). Thus, the recording element substrate is bonded to the element-substrate support member.

In the conventional liquid ejection head as shown in FIG. 6, typically, the recording element substrates are made of silicon, and the element-substrate support member is made of resin. Thus, the coefficient of linear expansion of the recording element substrates is smaller than that of the element-substrate support member. Hence, if heat treatment is performed to bond the recording element substrates and the element-substrate support member with the thermosetting adhesive, as in Japanese Unexamined Patent Application Publication No. 2002-19119, a tensile stress due to the difference in coefficient of linear expansion therebetween is generated in the recording element substrates. Furthermore, after the heat treatment, a compressive stress due to cooling of the recording element substrates and the element-substrate support member is generated in the recording element substrates. As a result, deformation and displacement of the recording element substrates due to these stresses may occur. In contrast, if the recording element substrates and the element-substrate support member are bonded together with a light-curable adhesive, as disclosed in Japanese Unexamined Patent Application Publication No. 2007-55071, an increase in temperature of the recording element substrates and the element-substrate support member can be suppressed compared with the case where a thermosetting adhesive is used, and hence, deformation and displacement of the recording element substrates are reduced. However, further reductions in deformation and displacement of the recording element substrates are required, as will be described below.

In recent years, liquid ejection recording apparatuses are required to perform recording at higher speeds. High-speed recording may be achieved by two-way printing, in which a liquid ejection head ejects liquid both while moving from one end to the other end and while moving from the other end to one end as it reciprocates. However, two-way printing requires higher liquid-landing precision than one-way printing. In one-way printing, because there is one printing direction, displacement of the liquid-landing position may be corrected to some extent by printing correction. However, in two-way printing, if displacement of the liquid-landing position occurs in each of the two directions, correction of such displacement is relatively difficult. Thus, further reductions in deformation and displacement of the recording element substrates are required. Because temperature rise occurs also when a light-curable adhesive is applied to the flat surface of the element-substrate support member and the recording element substrates are bonded thereto, deformation and displacement of the recording element substrates due to the stress caused by thermal expansion remain.

SUMMARY OF THE INVENTION

According to an aspect of the present invention, a liquid ejection head includes a recording element substrate that ejects liquid and an element-substrate support member to which the recording element substrate is bonded with an adhesive. A groove to be filled with the adhesive is provided in a bonding region of the element-substrate support member, at which the element-substrate support member and the recording element substrate are bonded together, along a part or an entirety of the outer circumference of the recording element substrate.

Further features of the present invention will become apparent from the following description of exemplary embodiments with reference to the attached drawings.

DESCRIPTION OF THE EMBODIMENTS

First Embodiment

Figure 1A:
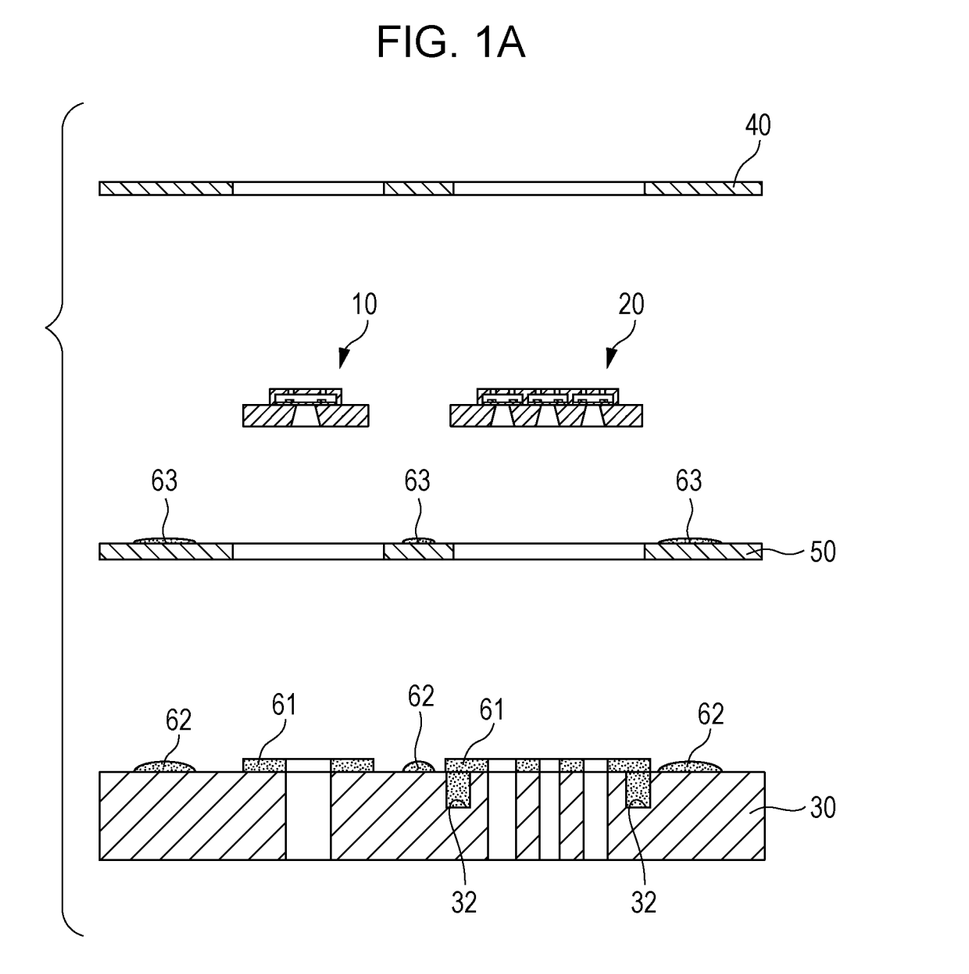
FIGS. 1A and 1B are a sectional view and a perspective view showing the configuration of a liquid ejection head according to a first embodiment, respectively.
Figure 1B:
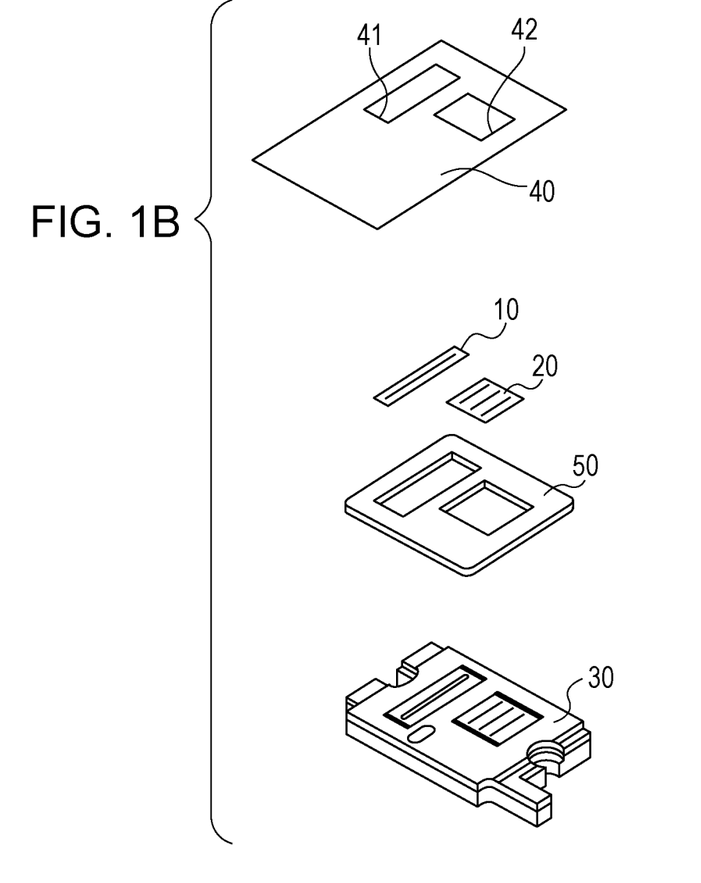
Figure 5:
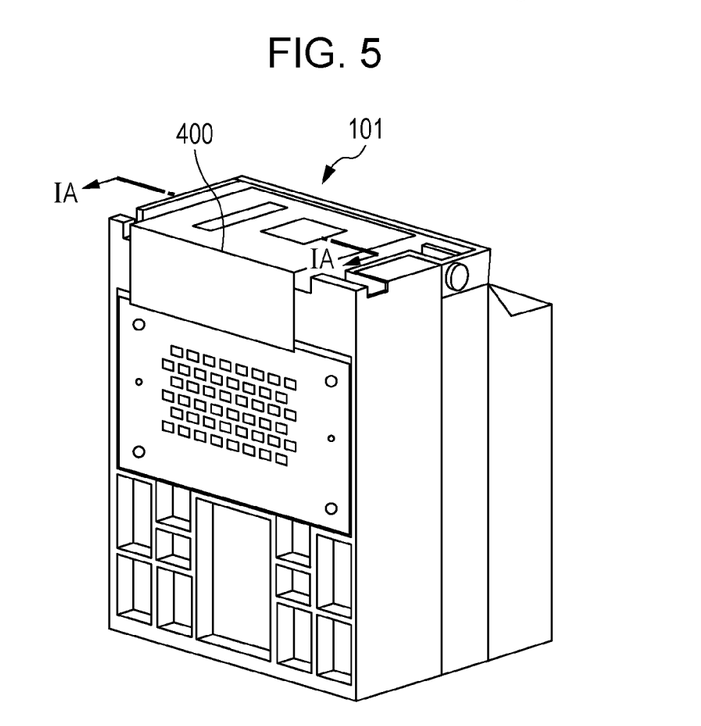
FIG. 5 is a perspective view of a liquid ejection head according to the embodiments of the present invention.

A first embodiment of the present invention will be described below. FIG. 5 is a perspective view of a liquid ejection head 101, which ejects liquid, such as ink, according to embodiments of the present invention. FIG. 1A is an exploded sectional view taken along line IA-IA in FIG. 5, showing the respective components. FIG. 1B is a perspective view of the respective components of the liquid ejection head shown in FIG. 1A.

As shown in FIGS. 1A and 1B, a liquid ejection head 1 according to this embodiment includes a recording element substrate 10 (a first recording element substrate), a recording element substrate 20 (a second recording element substrate), an element-substrate support member (a support member) 30, a wiring substrate 40, and a wiring-substrate support member 50. The recording element substrates 10 and 20 are bonded to the element-substrate support member 30 with an adhesive 61. Furthermore, the recording element substrates 10 and 20 are electrically connected to the wiring substrate 40, which is formed of a flexible film or the like and has a plurality of wires, and eject liquid by receiving supply of power from the wiring substrate 40. The wiring substrate 40 is bonded to the wiring-substrate support member 50 with an adhesive 63. The wiring-substrate support member 50 is bonded to the element-substrate support member 30 with an adhesive 62.

Figure 2A:
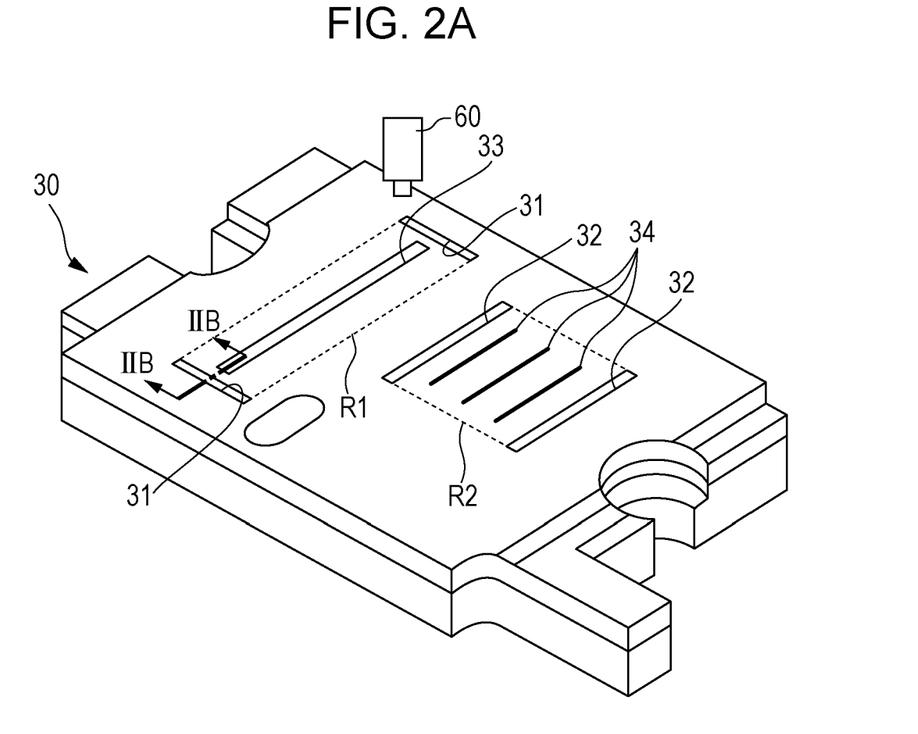
FIGS. 2A and 2B are a perspective view and a sectional view of an element-substrate support member shown in FIG. 1, respectively.
Figure 2B:
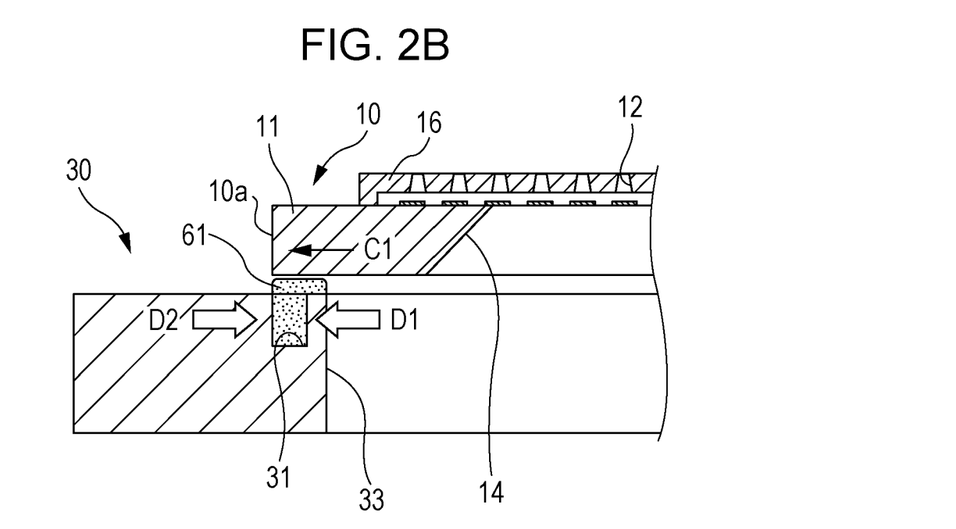

FIG. 2A is a perspective view of the element-substrate support member 30. FIG. 2B is a partial sectional view taken along line IIB-IIB in FIG. 2A. FIG. 2B shows a state in which the recording element substrate 10 is bonded to the element-substrate support member 30, for ease of explanation.

A bonding region R1 shown in FIG. 2A is a region where the element-substrate support member 30 and the recording element substrate 10 are in contact with and bonded to each other with the adhesive 61. Furthermore, a bonding region R2 is a region where the element-substrate support member 30 and the recording element substrate 20 are in contact with and bonded to each other with the adhesive 61. In this embodiment, the recording element substrates 10 and 20 are substantially rectangular.

Furthermore, in this embodiment, grooves 31 and 32 are provided in the surface of the element-substrate support member 30, to which the recording element substrates 10 and 20 are to be bonded. More specifically, in the surface of the element-substrate support member 30, the grooves 31 are provided at positions along the short sides, in the outer circumference, of the recording element substrate 10, and the grooves 32 are provided at positions along the short sides, in the outer circumference, of the recording element substrate 20.

An opening (through-hole) 33 is provided within the bonding region R1 in the surface of the element-substrate support member 30, and black (first color) liquid (in this embodiment, ink) is supplied to the recording element substrate 10 through the opening 33. Similarly, three openings 34 are provided within the bonding region R2, and three colored liquids (in this embodiment, color inks) other than black are individually supplied to the recording element substrate 20 through the openings 34.

Figure 3A:
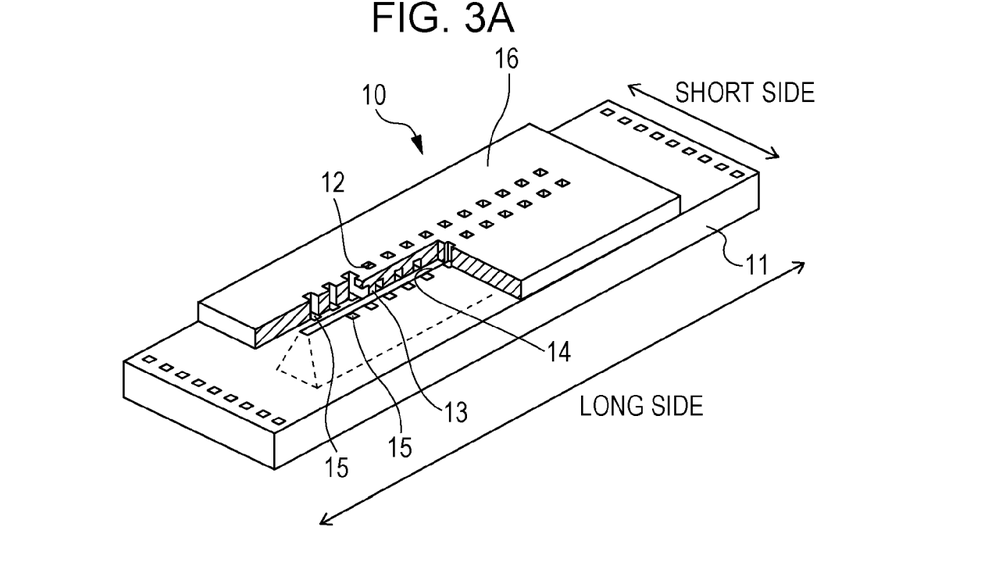
FIGS. 3A and 3B are perspective views of a recording element substrate shown in FIG. 1.
Figure 3B:
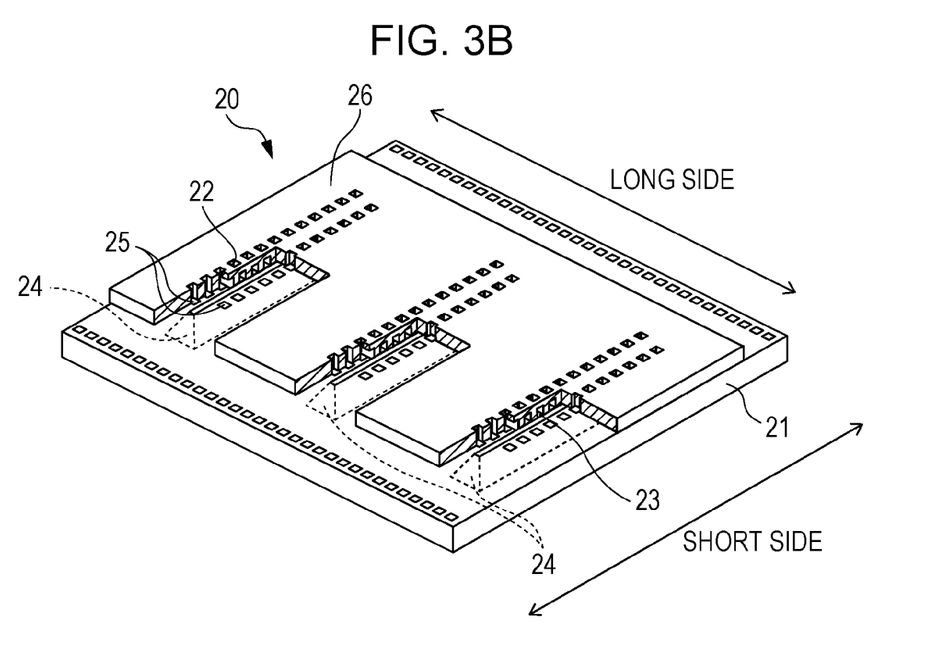

FIG. 3A is a perspective view of the recording element substrate 10, and FIG. 3B is a perspective view of the recording element substrate 20. FIGS. 3A and 3B are schematic perspective views for explaining the inside configuration, in which members 16 and 26 are partially cut away to expose the inside structures of the recording element substrates 10 and 20. The recording element substrate 10 for black ink includes a substrate 11 that has energy generating elements 15 for generating energy to eject liquid, and a member 16 that has ejection ports 12 through which the liquid is ejected. A flow path 13 is formed at a bonding portion between the substrate 11 and the member 16. The recording element substrate 20 for color inks has the same configuration.

As shown in FIG. 3A, in the recording element substrate 10, a supply port 14, which is a rectangular opening, is provided at the center of the silicon substrate 11. The supply port 14 communicates with an opening 33 in the element-substrate support member 30 (see FIG. 2B). The energy generating elements 15 for generating energy to eject liquid are arranged on both sides of the supply port 14, at substantially equal intervals. The ejection ports 12, through which the liquid is ejected, are provided at positions facing the energy generating elements 15. The flow path 13 is formed between the energy generating elements 15 and the ejection ports 12.

As shown in FIG. 3B, in the second recording element substrate 20, three supply ports 24, which are rectangular openings, are provided in parallel in the silicon substrate 21. Each of the supply ports 24 communicates with the corresponding one of the openings 34 in the element-substrate support member 30. A plurality of energy generating elements 25 are arranged on both sides of each supply port 24, at substantially equal intervals. A plurality of ejection ports 22, through which the liquid is ejected, are provided at positions facing the energy generating elements 25. Flow paths 23 are formed between the energy generating elements 25 and the ejection ports 12.

In the recording element substrates 10 and 20, liquid flowing in the supply ports 14 and 24 reach the energy generating elements 15 and 25. When the energy generating elements 15 and 25 heat the liquid, bubbles are formed by film boiling. These bubbles cause the liquid to be ejected from the ejection ports 12 and 22. The wiring substrate 40 is provided with wires (not shown) etc. for supplying power to the energy generating elements 15 and 25. The wiring substrate 40 is also provided with openings 41 and 42 from which the recording element substrates 10 and 20 are exposed, respectively (see FIG. 1B). Although the liquid ejection head according to this embodiment uses heat-generating elements as the energy generating elements 15 and 25, various other energy generating elements, such as piezoelectric transducers, etc., may also be used in the present invention.

A method of manufacturing the liquid ejection head 1 according to this embodiment will be described below.

First, the element-substrate support member 30 is formed by powder press forming. In this embodiment, the element-substrate support member 30 is made of alumina (aluminum oxide), whose coefficient of linear expansion is relatively close to that of the material of the recording element substrates 10 and 20 (in this embodiment, silicon). The grooves 31 and 32 are formed by this powder press forming. The wiring-substrate support member 50 is also made of alumina by powder press forming, similarly to the element-substrate support member 30.

Next, the adhesive 62 is applied to the bonding region of the element-substrate support member 30 relative to the wiring-substrate support member 50, and the wiring-substrate support member 50 is disposed on the adhesive 62. Then, the adhesive 61 is applied to the bonding regions R1 and R2. At this time, the adhesive 61 is applied so as to fill the grooves 31 and 32. In this embodiment, a filling step in which the adhesive 61 is applied to the bonding regions R1 and R2 and in which the adhesive 61 is injected into the grooves 31 and 32 is performed by using a dispenser 60 (see FIG. 2A) that discharges the adhesive 61 by means of compressed air.

After the adhesive 61 is injected into the grooves 31 and 32, the recording element substrates 10 and 20 are disposed onto the bonding regions R1 and R2, respectively, and heat treatment is performed in an oven. Then, the adhesive 63 is applied to the wiring-substrate support member 50, and the wiring substrate 40 is bonded thereto. Finally, the recording element substrates 10 and 20 are electrically connected to the wiring substrate 40 by inner-lead bonding, and the electrically connected portions are sealed with a sealing material. Thus, the liquid ejection head 101 is formed.

The above-described recording element substrates 10 and 20 of the recording head 101 according to this embodiment were observed, and the levels of deformation thereof before and after being bonded to the element-substrate support member 30 were measured. As a result, it was confirmed that the deformation was smaller than that in the case where the grooves 31 were not provided. Furthermore, as a result of examining the liquid-landing precision by performing printing, it was confirmed that the liquid-landing precision was higher than that in the case where the grooves 31 were not provided. From these results, it was confirmed that the stress that causes deformation and displacement of the recording element substrates 10 and 20 when the recording element substrates 10 and 20 are bonded to the element-substrate support member 30 with the adhesive 61 was reduced. The reason for this will be described below with reference to FIG. 2B.

When the heat treatment is performed to cure the adhesive 61, stress C1 due to thermal expansion is generated in a short side 10a of the recording element substrate 10, as shown in FIG. 2B. Similarly, stress D1 due to thermal expansion is generated in the element-substrate support member 30.

As in this embodiment, by providing the grooves 31 and 32 in the element-substrate support member 30, at positions corresponding to the ends of the recording element substrates 10 and 20, expansion of the element-substrate support member 30 due to the heat treatment is suppressed. This is because the grooves 31 and 32 inhibit propagation of the stress. In this embodiment, the grooves 31 and 32 are filled with the adhesive. The adhesive in the grooves 31 and 32 expands by the heat treatment. As shown in FIG. 2B, the thickness of a right wall of the groove 31 is smaller than that of a left wall of the groove 31. Hence, when the adhesive expands, the right wall (i.e., a member between the groove 31 and the opening 33) of the groove 31 is deformed by a greater amount than the left wall. Because a force acting in a direction opposite to the direction of the stress D1 is generated, expansion of the element-substrate support member 30 is reduced.

Furthermore, in this embodiment, the coefficient of linear expansion and volume of the element-substrate support member 30, which is made of alumina, are greater than those of the substrate 11, which is made of silicon. Hence, the stress D1 is greater than the stress C1. In the element-substrate support member 30, a stress D2, which is a reaction force to the thermal expansion of the adhesive 61 injected into the groove 31, is generated. As shown in FIG. 2B, the stress D2 acts in a direction opposite to the direction of the stress D1.

In the conventional liquid ejection head (see FIG. 6), in which the grooves 31 are not provided and the recording element substrates are bonded to the flat surface of the element-substrate support member, the difference between the stress D1 and the stress C1 is large. Hence, a relatively large tensile stress is applied to the recording element substrate 10. As a result, deformation and displacement of the recording element substrate 10 may occur. However, in the liquid ejection head 1 according to this embodiment, as described above, the stress D2 that acts in the direction opposite to the direction of the stress Distress D1 is generated. Thus, the stress generated in the element-substrate support member 30 equals D1−D2. Because the difference in stress between the recording element substrate 10 and the element-substrate support member 30 is reduced by −D2, the tensile stress applied to the recording element substrate 10 is reduced. In short, the adhesive 61 injected into the grooves 31 contributes to reductions in deformation and displacement of the recording element substrate 10. Reductions in deformation and displacement of the recording element substrate 20 are achieved by the same mechanism. As a result, the liquid-landing precision is improved, enabling high-speed recording by two-way printing. In this embodiment, the grooves 31 are provided at positions corresponding to the short sides of the outer circumferences of the recording element substrates 10 and 20. Because the influence of the above-described stresses is greater at the short sides than at the long sides in rectangular recording element substrates, the provision of the grooves 31 at positions corresponding to, at least, the short sides is effective. Although the provision of the grooves over the entire width of the short sides, as shown in FIG. 2A, is effective, the present invention may be applied to a configuration in which the groove is provided at, at least, part of the short sides or in which a plurality of grooves are provided in a non-continuous manner. Furthermore, the grooves 31 may be partially provided outside the bonding regions R1 and R2, as long as the grooves 31 are provided at positions corresponding to regions between the supply ports 14 and 24 and the short sides of the recording element substrates 10 and 20.

Although the adhesive 61 is a thermosetting adhesive in this embodiment, it may be a light-curable adhesive. When the adhesive 61 is a light-curable adhesive, the adhesive 61 is cured by light-radiation treatment, in which an ultraviolet ray is radiated, instead of the heat treatment. Because temperature rises of the recording element substrates 10 and 20 and element-substrate support member 30 can be suppressed by using the light-curable adhesive, compared with a case where the thermosetting adhesive is used, deformation and displacement of the recording element substrates 10 and 20 can be further reduced.

Second Embodiment

Figure 4:
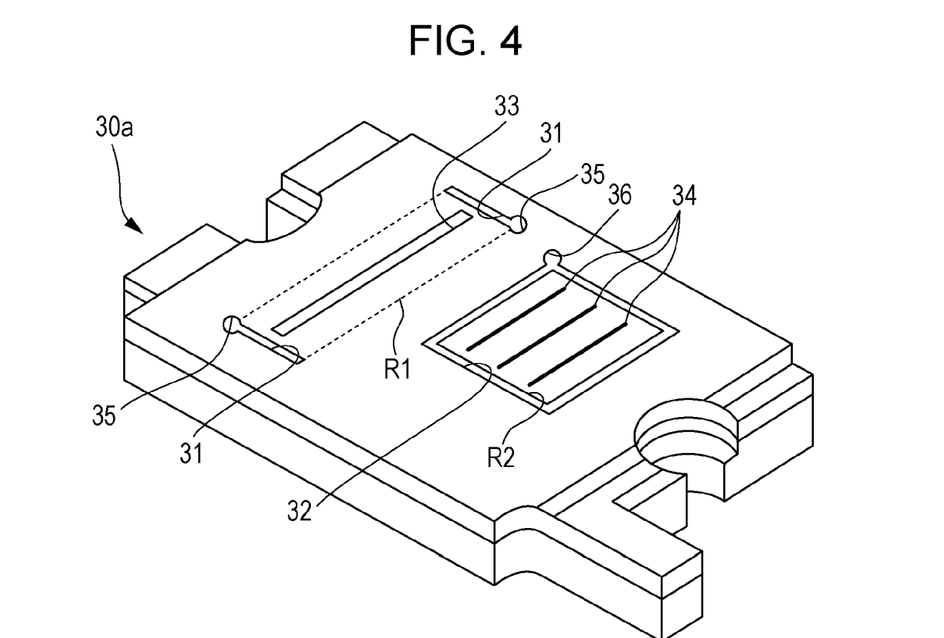
FIG. 4 is a perspective view of an element-substrate support member according to a second embodiment.

A second embodiment of the present invention will be described below focusing on the differences from the first embodiment. FIG. 4 is a perspective view of an element-substrate support member provided on a liquid ejection head according to this embodiment. The same components as those of the element-substrate support member 30 according to the first embodiment will be denoted by the same reference numerals, and detailed descriptions thereof will be omitted.

An element-substrate support member 30a shown in FIG. 4 is made of resin and is formed integrally with the wiring-substrate support member 50 by injection molding. Note that FIG. 4 does not show the wiring-substrate support member 50. In the element-substrate support member 30a, the grooves 31 are provided along the short sides of the recording element substrate 10, as those according to the first embodiment. On the other hand, the groove 32 is provided along the entire outer circumference of the recording element substrate 20. The recording element substrate 10 has a rectangular shape in which the difference in length between the long sides and the short sides is greater than that of the recording element substrate 20. In the recording element substrates having such a shape, the stress generated by increasing the temperature to cure the adhesive is greater at the short sides than at the long sides. Thus, the grooves 31 are provided only along the short sides of the recording element substrate 10. Note that the groove 31 may be provided along the entire outer circumference of the recording element substrate 10. On the other hand, the recording element substrate 20 has a rectangular shape in which the difference in length between the long sides and the short sides is smaller than that of the recording element substrate 10. In the recording element substrates having such a shape, the same stress is applied to the long sides and the short sides. Thus, in this embodiment, the groove 32 is provided along the entire outer circumference of the recording element substrate 20. When a plurality of recording element substrates having different planar aspect ratios are provided in one liquid ejection head, it is desirable that grooves be provided only along the short sides of a recording element substrate that has a relatively large aspect ratio and that grooves be provided along both the short sides and the long sides of a recording element substrate that has a relatively small aspect ratio. By doing so, the size of the liquid ejection heads, as well as the manufacturing cycle time thereof, can be reduced.

Furthermore, the element-substrate support member 30a according to this embodiment is provided with recesses 35 and 36. The recesses 35 are provided outside the bonding region R1 and communicate with the grooves 31. On the other hand, the recess 36 is provided outside the bonding region R2 and communicates with the groove 32. The function of the recesses 35 and 36 will be described below.

In this embodiment too, similarly to the first embodiment, the adhesive 61 is applied to the bonding regions R1 and R2 and is injected into the grooves 31 and 32 by using the dispenser 60. Because the dispenser 60 uses compressed air to discharge the adhesive 61, bubbles may be formed in the adhesive 61. In particular, it is highly probable that a first portion of the adhesive 61 discharged from the dispenser 60 contain bubbles. If the recording element substrates 10 and 20 are bonded to the element-substrate support member 30 with the adhesive 61 containing bubbles, bonding may be insufficient.

To overcome this problem, in this embodiment, first, a tip of the dispenser 60 is inserted into the recesses 35 and 36, and the adhesive 61 containing bubbles is discharged therein. Then, the dispenser 60 is moved, and the adhesive 61 is injected into the grooves 31 and 32. By doing so, it is possible to fill the grooves 31 and 32 with the adhesive 61 that contains a reduced amount of bubbles. Note that, it is desirable that the depth and width of the recesses 35 and 36 be larger than those of the grooves 31 and 32 to ensure sufficient capacity for receiving the adhesive 61 containing bubbles. This configuration can prevent the adhesive 61 containing bubbles from flowing into the grooves 31 and 32.

In this embodiment, the dispenser 60 departs from the recess 36, moves along the groove 32, and returns to the recess 36, while discharging the adhesive. Then, the dispenser 60 moves to the recess 35 adjacent to the recess 36 and restarts the discharge of the adhesive at the recess 35. When the recesses 36 and 35 are adjacent to each other as in this case, the dispenser 60 can be moved along the shortest route, reducing the time needed to apply the adhesive. Because the element-substrate support member 30a according to this embodiment is made of resin, the coefficient of linear expansion thereof is larger than that of the element-substrate support member 30 according to the first embodiment, which is made of alumina. Because the difference in coefficient of linear expansion between resin and silicon is much larger than that between alumina and silicon, the configuration of the present invention is more effective in this embodiment.

Comparison Example

A comparison example to be compared with the first and second embodiments of the present invention will be described below. A liquid ejection head according to this comparison example is a liquid ejection head 101 shown in FIG. 6. An element-substrate support member 300 of the liquid ejection head 101 is made of resin and does not have the grooves 31 or 32. In this liquid ejection head 101, after the adhesive 610 was applied, the recording element substrates 100 and 200 were disposed on the adhesive 610 and heated in an oven. As a result of observation of the recording element substrates 100 and 200, under which the adhesive 610 was cured by heat, a cracked recording element substrate was found. Furthermore, as a result of performing inner-lead bonding on a recording element substrate that was crack-free, deformation of the inner lead was found. The deformation of the inner lead may be caused by failure to bond the inner lead to the proper position due to displacement of the recording element substrate. Hence, as in the present invention, by injecting the adhesive into the grooves provided in the element-substrate support member, the stresses applied to the recording element substrates are reduced, improving reductions in deformation and displacement of the recording element substrates.

In the present invention, because concentration of stress on one side portion of the recording element substrates can be avoided by providing a sealing member and a deformation preventing member, displacement of the recording element substrates can be suppressed. As a result, lowering of the liquid-landing precision of the liquid ejected from the liquid ejection head of the present invention is suppressed. Accordingly, an ink jet printer that employs the liquid ejection head of the present invention can perform high-quality recording.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-098368, filed May 12, 2014 and Japanese Patent Application No. 2015-056092, filed Mar. 19, 2015, which are hereby incorporated by reference herein in their entirety.

What is claimed is:
1. A liquid ejection head comprising:
a recording element substrate that ejects liquid; and
an element-substrate support member to which the recording element substrate is bonded with an adhesive,
wherein a groove to be filled with the adhesive is provided in a bonding region of the element-substrate support member, at which the element-substrate support member and the recording element substrate are bonded together, along a part or an entirety of an outer circumference of the recording element substrate,
wherein the recording element substrate includes a first recording element substrate and a second recording element substrate that has a planar aspect ratio smaller than a planar aspect ratio of the first recording element substrate,
wherein the groove is provided in a bonding region of the element-substrate support member, at which the element-substrate support member and the first recording element substrate are bonded together, along a short side of the outer circumference of the first recording element substrate, and no groove is provided along a long side of the outer circumference of the first recording element substrate, and
wherein the groove is provided in a bonding region of the element-substrate support member, at which the element-substrate support member and the second record- ing element substrate are bonded together, along each of a short side and a long side of the outer circumference of the second recording element substrate.

2. The liquid ejection head according to claim 1,
wherein the recording element substrate is rectangular, and
wherein the groove is provided along a short side of the recording element substrate.

3. The liquid ejection head according to claim 1,
wherein a recess that communicates with the groove is provided outside the bonding region of the element-substrate support member.

4. The liquid ejection head according to claim 3, wherein the depth of the recess is larger than the depth of the groove.

5. The liquid ejection head according to claim 3, wherein the width of the recess is larger than the width of the groove.

6. The liquid ejection head according to claim 1,
wherein the recording element substrate includes a first recording element substrate that ejects a liquid of a first color and a second recording element substrate that ejects a liquid of a second color different than the first color, and
wherein the groove is provided along each of the outer circumferences of the first and second recording element substrates.

7. The liquid ejection head according to claim 1, wherein the adhesive is a light-curable adhesive.

8. The liquid ejection head according to claim 1, wherein the adhesive is a thermosetting adhesive.

9. The liquid ejection head according to claim 1, wherein the element-substrate support member is made of resin.

10. The liquid ejection head according to claim 1,
wherein the element-substrate support member is provided with a through-hole through which the liquid is supplied to the recording element substrate, and
wherein a distance between the groove and the through-hole is smaller than a distance between the groove and an end of the element-substrate support member that is closest to the groove.

11. A method of manufacturing a liquid ejection head including a recording element substrate that ejects liquid, and an element-substrate support member to which the recording element substrate is bonded with an adhesive, the method comprising:
forming a groove in a bonding region of the element-substrate support member, at which the element-substrate support member and the recording element substrate are bonded together, along a part or an entirety of an outer circumference of the recording element substrate; and
filling by applying the adhesive to the bonding region and injecting the adhesive into the groove,
wherein the groove forming step includes forming a recess that communicates with the groove, and
wherein the filling step includes discharging, with a dispenser, the adhesive into the recess before injecting the adhesive into the groove.

12. The method of manufacturing a liquid ejection head according to claim 11, wherein the filling step is performed by using theft dispenser that discharges adhesive by means of compressed air.

13. The method of manufacturing a liquid ejection head according to claim 11, wherein the adhesive is a light-curable adhesive.

* * * * *